US010754434B2

(12) United States Patent
Hall et al.

(10) Patent No.: US 10,754,434 B2
(45) Date of Patent: Aug. 25, 2020

(54) MOTION GESTURE CAPTURE BY SELECTING CLASSIFIER MODEL FROM POSE

(71) Applicant: Intel Corporation, Santa Clara, CA (US)

(72) Inventors: James Brian Hall, Tucson, AZ (US); Tyler Fetters, Hillsboro, OR (US); Stephanie Moyerman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 16/086,797

(22) PCT Filed: Apr. 1, 2016

(86) PCT No.: PCT/US2016/025657
§ 371 (c)(1),
(2) Date: Sep. 20, 2018

(87) PCT Pub. No.: WO2017/171858
PCT Pub. Date: Oct. 5, 2017

(65) Prior Publication Data
US 2019/0094979 A1 Mar. 28, 2019

(51) Int. Cl.
G06F 3/01 (2006.01)
G06F 3/0346 (2013.01)
(Continued)

(52) U.S. Cl.
CPC ............ G06F 3/017 (2013.01); G06F 3/0346 (2013.01); G01C 19/00 (2013.01); G01P 15/18 (2013.01);
(Continued)

(58) Field of Classification Search
CPC ..... G06F 3/017; G06F 3/0346; G06K 9/6268; G06K 9/6218; G01P 15/18; G01C 19/00
See application file for complete search history.

(56) References Cited

U.S. PATENT DOCUMENTS 8,968,091 B2 3/2015 Raptis et al.
9,002,099 B2 4/2015 Litvak et al.
(Continued)

FOREIGN PATENT DOCUMENTS

| CN | 204009751 U | 12/2014 |
| WO | WO-2012112402 A2 | 8/2012 |
| WO | WO-2017171858 | 10/2017 |

OTHER PUBLICATIONS

"International Application Serial No. PCT/US2016/025657, International Search Report dated Dec. 27, 2016", 3 pgs.
(Continued)

Primary Examiner — Rodney Amadiz
(74) Attorney, Agent, or Firm — Schwegman Lundberg & Woessner, P.A.

(57) ABSTRACT

System and techniques for gesture capture are described herein. A first representation of a sensor array may be collected into a first sensor composition. The first sensor composition may be filtered to output a pose status. Here, the pose status corresponds to a pose in a library of poses. A second representation of the sensor array may be collected into a second sensor composition. A fit of the second sensor composition to a model may be measured. The fit may be provided to a gesture consumer based on the fit and the pose.

24 Claims, 6 Drawing Sheets

(51) Int. Cl.
   *G01C 19/00*    (2013.01)
   *G01P 15/18*    (2013.01)
   *G06K 9/62*     (2006.01)

(52) U.S. Cl.
   CPC ......... *G06K 9/6218* (2013.01); *G06K 9/6268* (2013.01)

(56) References Cited

U.S. PATENT DOCUMENTS

| | | |
|---|---|---|
| 9,171,223 B2 * | 10/2015 | Kim .................. G06K 9/00335 |
| 10,101,793 B2 * | 10/2018 | Tu ........................ G06F 1/3265 |
| 10,139,914 B2 * | 11/2018 | Elangovan .............. G06F 3/011 |
| 2010/0009761 A1 * | 1/2010 | Ohta .................... G01C 19/065 463/43 |
| 2010/0063794 A1 | 3/2010 | Hernandez-rebollar |
| 2014/0002338 A1 * | 1/2014 | Raffa .................... G06F 1/1694 345/156 |
| 2014/0236519 A1 * | 8/2014 | Hergesheimer ......... G01P 21/00 702/95 |
| 2014/0257535 A1 | 9/2014 | Morris et al. |
| 2015/0046886 A1 | 2/2015 | Goel et al. |
| 2015/0113417 A1 | 4/2015 | Yuen et al. |
| 2019/0101991 A1 * | 4/2019 | Brennan ................. G06T 7/248 |

OTHER PUBLICATIONS

"International Application Serial No. PCT/US2016/025657, Written Opinion dated Dec. 27, 2016", 8 pgs.

"International Application Serial No. PCT US2016 025657, International Preliminary Report on Patentability dated Oct. 11, 2018", 10 pgs.

* cited by examiner

US 10,754,434 B2

MOTION GESTURE CAPTURE BY SELECTING CLASSIFIER MODEL FROM POSE

CLAIM OF PRIORITY

This patent application is a U.S. National Stage Application under 35 U.S.C. 371 from International Application No. PCT/US2016/025657, filed Apr. 1, 2016, published as WO 2017/171858, which is incorporated herein by reference.

TECHNICAL FIELD

Embodiments described herein generally relate to user interface devices and more specifically to gesture capture.

BACKGROUND

User interface devices, such as keyboards pointing devices, etc., generally include direct human manipulation of the device to direct activities, for example, on a computer. Gesture devices generally attempt to observe human motion without direct human manipulation to produce system input to direct the system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
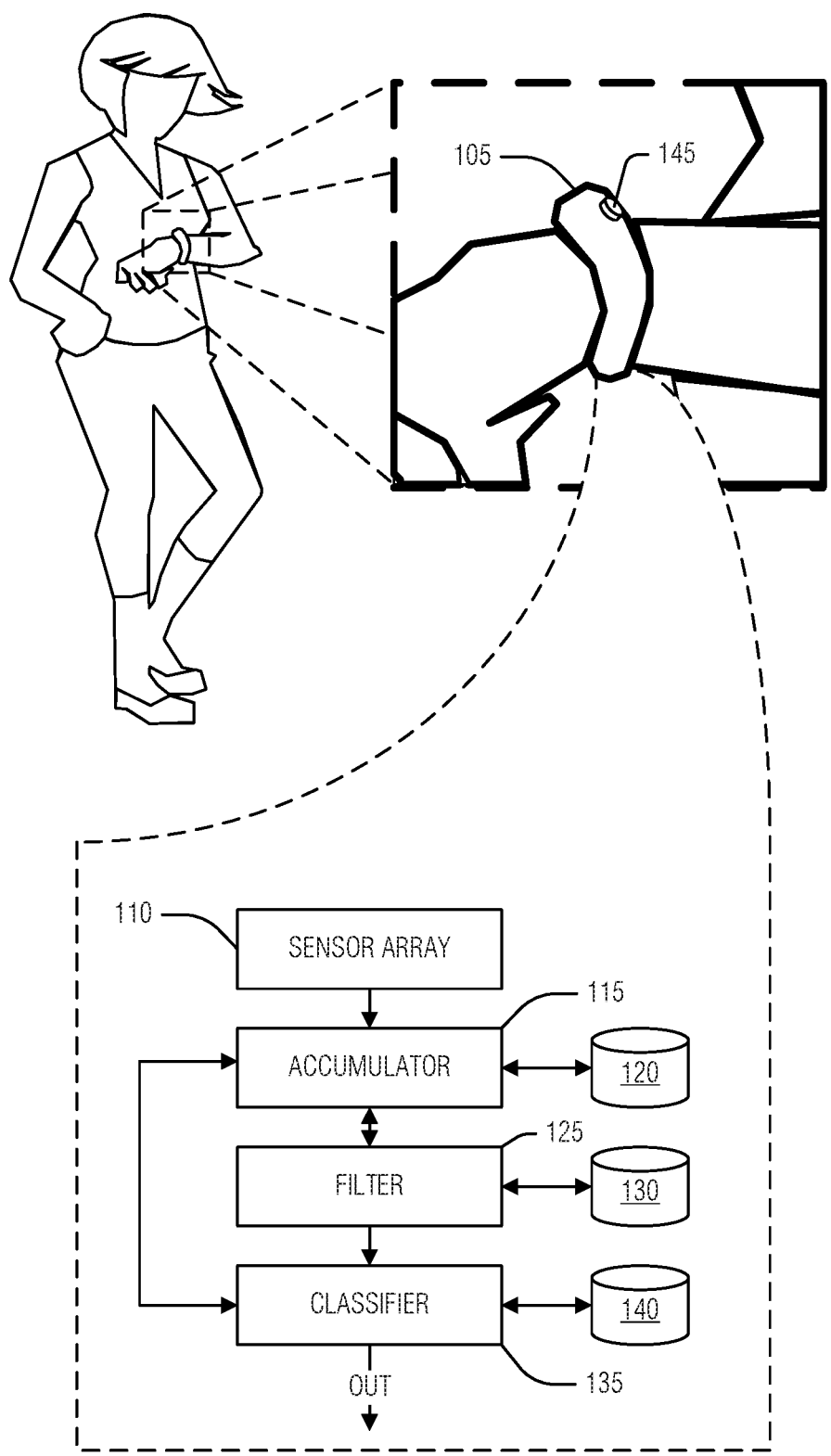
FIG. 1 is a block diagram of an example of device for gesture capture, according to an embodiment.

Gesture based user input may provide benefits over traditional user input devices by allowing for a greater degree of expression while freeing the user from particular physical environments, such as tabletops as is the case with a mouse. Generally, gesture devices employ an observation technique, such as visual classification, intersecting light plane, or movement devices to ascertain motion or position of a gesture target (e.g., a hand, finger, body, eye, etc.). For many of these techniques, sophisticated hardware is used to capture and process the complex problem domain of, for example, visually identifying the position of a hand to point to an on-screen object.

As wearable devices become more ubiquitous, they provide a convenient and often available observational platform from which to provide gesture input into a system, such as a smartphone, computer, etc. However, these devices are often constrained in terms of sensor availability, energy, and computational power.

Previous approaches to gesture capture (e.g., recognition) often require higher processing power. Thus, to use these approaches with wearable device often entails pairing the data collection device (e.g., the wearable) to another device with higher computational power and memory, such as a smartphone or computer. Many of previous techniques also require a great quantity of measurements (e.g., in excess of 100 samples, and hence are memory intensive. Such heightened memory requirements reduce system resources and generally result in limiting the number of gestures recognized per fixed amount of on device memory.

Some techniques are based on advanced, and thus constraining hardware, such as camera based systems or radar. These techniques are also limited to gestures observable in a line-of sight, constraining the user. Further, techniques are often cumbersome and expensive to set up and calibrate.

The techniques discussed above relate to devices to actually capture a user's movement. Translating the observed movements into a gesture entails processing this observed movements. Often, currently employed techniques use hardcoded rules to identify gestures. Using these hardcoded rules means that source code or rule sets must be manually altered or invented, often by an engineer, to permit recognition of a new gesture or adapt a gesture to a specific user.

What is needed is a technique to observe user movements and process the observations into gestures in a storage and computationally efficient manner. This may be accomplished by hierarchically identifying motions and using a previous identification to select from several options. For example, motion data may be captured, the motion data both indicating an orientation of an object (e.g., a hand) and movement (e.g., whether or not the hand is stationary). If the hand is stationary, the orientation data may be used to determine a pose among several poses. After the pose is determined, the motion data may be cleared and additional motion data captured. The Additional motion data may be combined with the pose determination to ultimately determine a user gesture.

In an example, a hierarchical clustering technique is employed. In this technique, a specific pose serves as a trigger and a following motion readings are used to identify the gesture. A computationally lightweight clustering method may be used to identify whether the device is in a pose which is associated with a gesture, and if it is, another lightweight clustering algorithm determines if the motion that follows the pose corresponds to a gesture. If both of these conditions are met, the device detects that the gesture has occurred and outputs the gesture. If either are not met, the motion is rejected as not a gesture. This bifurcated technique is well suited to use cases where false positives are highly undesirable, for example, during on stage demonstrations using gesture control.

FIG. 1 is a block diagram of an example of device 105 for gesture capture, according to an embodiment. As illustrated, the device 105 is a wrist-worn wearable device that includes a sensor array 110, an accumulator 115 with a buffer 120, a filter 125 with a pose library 130, and a classifier 135 with a model library 140, all of which are implemented in computer hardware, such as that described below with respect to FIG. 6.

The sensor array 110 includes one or more sensors to observe the user. In an example, the sensor array 110 includes an accelerometer. In an example, the sensor array 110 includes a gyroscope. Output from one or more sensors of the sensor array 110 may be cleaned (e.g., subject to a noise filter) or otherwise processed (e.g., aggregated into fixed-time samples) prior to being communicated to a data consumer. In an example, the cleaning of the sensor data is performed by a low pass filter disposed in the device 105 between the sensor array 110 and the accumulator 115.

The accumulator 115 includes or is in communication with during operation a buffer 120. The buffer 120 is a memory, register, or persistent storage device to hold processing parameters and outputs. The accumulator 115 is arranged to collect a first representation of the sensor array 110 into a first sensor composition and a second representation of the sensor array 110 into a second sensor composition. As used herein, the representation of the sensor array 110 is the output of the sensor array 110. The accumulator 115 obtains (e.g., retrieves or receives) the sensor array 110 output and transforms the output into the given sensor composition. It is this sensor composition which will be output to the filter 125 or the classifier 135 to ascertain a pose and gesture respectively. Thus, the first sensor composition is used to determine a pose status, including a pose if it exists, and the second composition is used to determine a gesture. In an example, the accumulator 115 is arranged to clear stored or calculated values, for example from the buffer 120, at certain times. One such time is a pose status determination by the filter 125. When the filter 125 finds a pose, the accumulator 110 clears its values to create the second sensor composition for the classifier 135. In this way, hardware of the accumulator 115 (e.g., memory) is reduced, saving costs in both manufacture and power consumption.

In an example, the accumulator 115 is arranged to store an angular velocity average in the buffer 120. The accumulator 115 may include a calculator to accept additional gyroscope samples and update the angular velocity average in the buffer 120 with the additional gyroscope sample. To perform the average, the calculator may sum samples received over a period of time and divide by the number of samples. Thus, the calculator may store a count of the number of samples and a running total of the sum as well as a timing metric. In an example, the calculator may instead employ a running average calculation or estimation, such as:

$$AV_n = AV\left(\frac{(n-m)}{n} + \frac{s}{n}\right)$$

where $AV_n$ is the new average, AV is the current average, n is the number of samples, m is the number of samples since the average was last updated, and s is the sum of the samples received since the average was last updated. The accumulator 115 or the calculator may employ this same technique to create a portion of a sensor composition from accelerometer data as well. Other calculations that may be stored as part of the sensor composition include a maximum value, a minimum value, a median, a standard deviation, average of absolute values, or other metrics that characterize the sensor data.

The sensor compositions include processed sensor data for a variety of sensor outputs. For example, an accelerometer may measure acceleration over one or more axes. For example, in three dimensional space, there are generally considered six degree of freedom (e.g., forward, back, up, down, left, and right) on three axes (e.g., x, z, and y respectively). Thus, the composition may include, for example, three components, each component including an average of acceleration in a given axes. Similarly, for a gyroscope, the average (or other) measures of roll (x axis), yaw (z axis), and pitch (y axis) may be separate components in the sensor composition. In an example, the first sensor composition includes four components, averages of angular velocity and acceleration on the x, y, and z axes. In an example, these averages are determined over a fixed timer period. In an example, the timer period is a quarter of a second.

In an example, the second sensor composition is composed entirely of results derived from the gyroscope. In an example, the components of the second sensor composition include at least one of an average, maximum, minimum, standard deviation, or absolute value average values for one or more of the x, y, or z axes of the gyroscope. In an example, these values are calculated over a predetermined time window. In an example, the time window is half a second long. In an example, the time window begins after a pose is detected (e.g., by the filter 125).

In an example, the accumulator 115 produces the same data for both the first sensor composition and the second sensor composition, clearing the data after a signal from the filter 125, a timer (e.g., defining sample periods), or other triggering event. In this example, the components of the sensor compositions are a union of those components described above with respect to each of the first sensor composition and the second sensor composition. In this configuration, the design of the accumulator 115 is simplified, reducing costs.

The filter 125 is arranged to accepts the first sensor composition and provide output based on the first sensor composition. The output includes a pose status. The pose status indicates whether or not a pose is observed. If a pose is observed, the pose status provides identification of the pose from the pose library 130. To detect the pose, the filter 125 determines whether the device 105 is stationary. To make this determination, the filter 125 looks for sensor composition components that are below w threshold (e.g., moving about a point in space that is less than a threshold). Here, the threshold addresses the normal tremor or minor motion inherent in a human extremity attempting to remain still. In an example, only accelerometer components of the sensor composition are used exclusively to ascertain whether the device 105 is stationary.

Once the filter 125 determines that the device is stationary, the filter 125 analyzes the first sensor composition to determine whether the data is indicative of a pose in the pose library 130. To this end, the filter 125 may perform a clustering of the first sensor composition components. The clustering characteristics (e.g., kernels, centroids, etc.) for each known pose may be stored in the pose library 130. The first sensor composition components are then subject to the clustering technique for each of the poses and the match, or closest pose, may be selected. It is understood that other matching techniques may be used, such as a trained neural network using the first composition components as inputs, however, clustering techniques may be both computationally and storage efficient, lending to effectiveness in small devices. In an example, the pose is determined exclusively from gyroscope components of the first sensor composition.

In an example, once the pose status is provided by the filter 125, the filter 125 is arranged to signal the accumulator 115 to reset its data collection to prepare for another first sensor composition or a second sensor composition depending on whether a pose was detected. In an example, the pose status that includes an identified pose is provided to the classifier.

The classifier 135 includes an input, an output, and a pattern. The input is arranged to obtain the second sensor composition from the accumulator 115. The output is arranged to provide (e.g., via a transceiver, a signal line, bus, interlink, etc.) a gesture to a gesture consumer (e.g., an operating system, user interface, device driver, etc.). The pattern is arranged to fit the second sensor composition to a model from the model library 140. This fit is performed in much the same way that the filter 125 operates, including the use of clustering to match the second sensor composition to the model. In an example, the model library 140 is arranged in a tree-like manner, such that the models tested against the second sensor composition are narrowed by the pose received from the filter 125. An example of such a gesture tree is described below with respect to FIG. 3.

In an example, the model is a collection of cluster points (e.g., boundaries, a centroid and a radius, a kernel, etc.). To measure the fit of the second sensor composition includes the classifier 135 being arranged to compare pieces of the second sensor composition to the cluster points. This comparison may be a distance, for example, of cluster points and corresponding second sensor composition components in a space. It is noted, however, that a number of cluster techniques may be employed by the classifier 135 to measure the fit.

A benefit of the classifier 135 and filter 125 using a learning technique (e.g., the clustering) involves the ease with which a user may train a new gesture. For example, the device 105 may include a user input device 145 (e.g., a button, touch panel, etc.). When the user pushes (or pushes and holds, taps a pattern, etc.) the user input device 145, a trainer (not shown) of the device 105 will use the accumulator 115, the filter 125, or the classifier 135 to develop a new gesture or pose and respectively store them into the pose library 130 or model library 140. This is accomplished by the trainer being activated by the user input device 145. Once activated, the accumulator 115 and filter 125 obtain a pose status as described above. If no pose is recognized, the values used to determine a pose are stored as a new pose in the pose library.

In an example, the trainer may cause an audible or visible signal to the user to indicate that the necessary stationary measurement is achieved (e.g., half a second). The user may then perform the gesture. As above, the sensor components of the new gesture are captured by the accumulator 115 and given to the classifier 135. If the pose-gesture combination is unknown, the model based is stored in the model library 140. If the combination is known, the trainer is arranged to warn the user.

The operation of the classifier 135 is perhaps different than that mentioned above by simplifying, or clarifying, the model. For example, if the gesture is primarily a downward dip of the hand, but there is a minor side-to-side motion, this side-to-side component may be omitted from the model. To make this determination, the user may be prompted to repeat the gesture several times. The cluster points, for example, may be averaged and subject to a motion threshold. If the deviation between a start and end position is less than the threshold, it is considered that that component of motion is unimportant and is omitted from the model. In an example, omitted features are still tested by the classifier 135 for fit, but rely on a default value, perhaps saving space in the model library.

The device 105 as described above provides efficient and convenient gesture capture, which may be important for practical wearable devices. Further, the clustering, or machine-learning, nature of the gesture capture provides an easy way for users to extend the gestures understood without entailing expensive engineering resources. Additionally, by employing the pose, stop, gesture detection technique, a large number of gestures may be recognized while reducing false positives, decreasing the complexity of any one measurement, thus allowing for the use of less sophisticated components, less power, and greater accuracy.

Figure 2A:
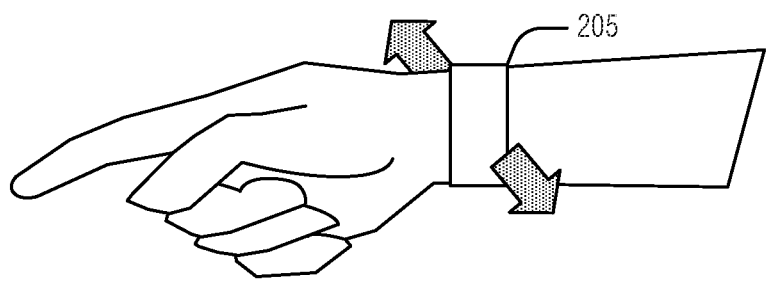
FIGS. 2A-2C illustrate an example of motion for a gesture, according to an embodiment.
Figure 2B:
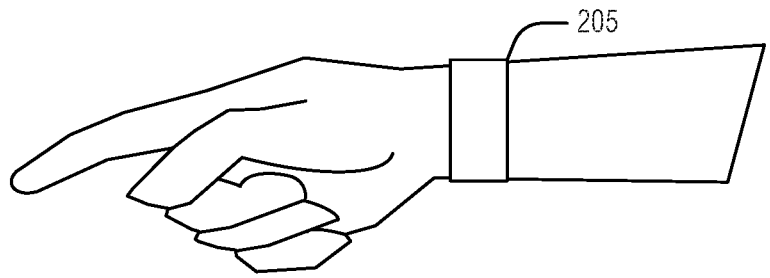
Figure 2C:
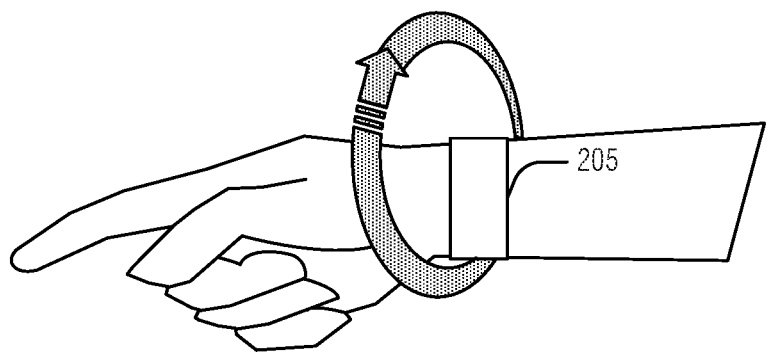

FIGS. 2A-2C illustrate an example of motion for a gesture, according to an embodiment. As illustrated, a single gesture, as measured from the device 205, is finally determined using the pose-stop-gesture technique described above. FIG. 2A illustrates a moving hand. When the hand stops moving (FIG. 2B), the pose (e.g., orientation) of the hand is determined. In an example, the pause is a quarter of a second. Once the pose is ascertained, the additional movement of the hand (FIG. 2C) is used to determine the gesture of the pose. Thus, the same gesture may have different meanings depending on the pose that precedes the gesture observation.

Figure 3:
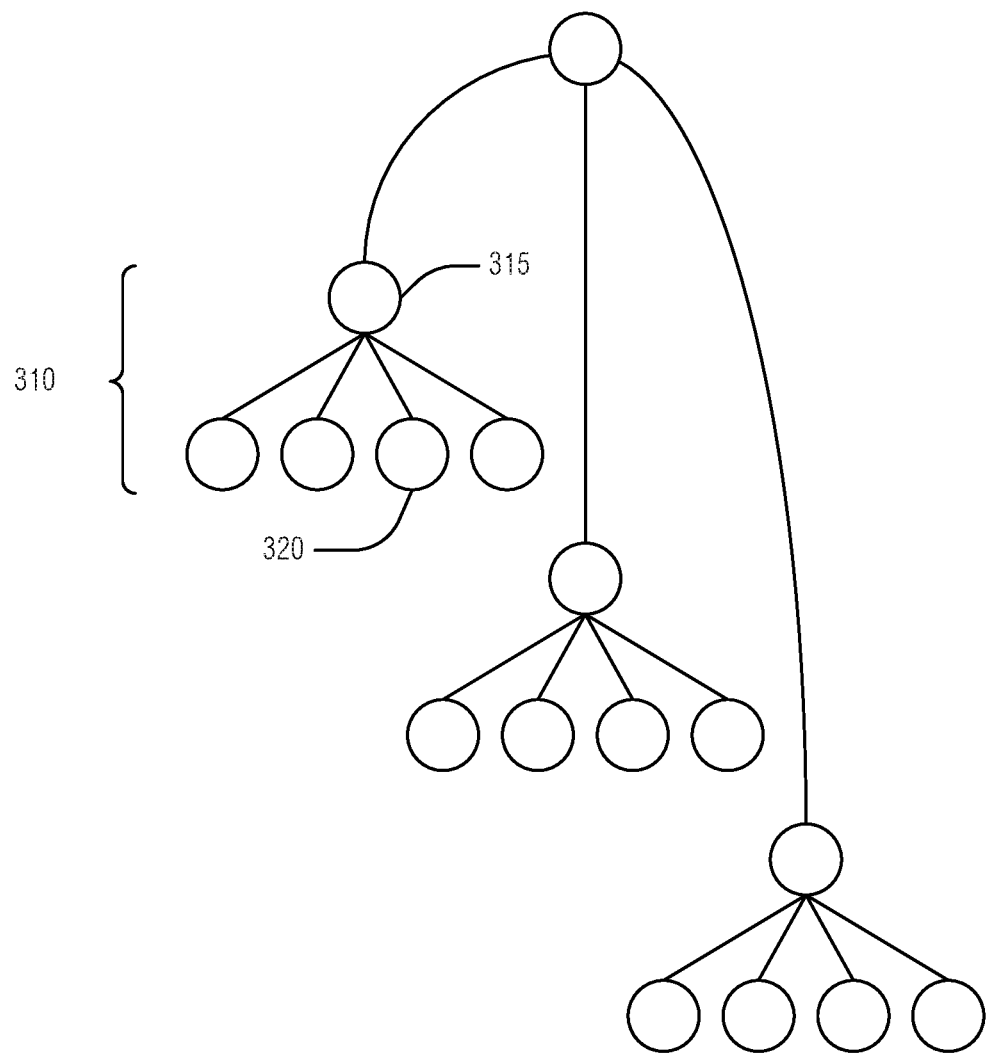
FIG. 3 illustrates an example of a gesture tree, according to an embodiment.

FIG. 3 illustrates an example of a gesture tree 300, according to an embodiment. The gesture tree 300 includes one or more gesture groups 310. A gesture group 310 includes a pose 315 and one or more gestures 320. As noted above, the gesture 320 is a combination of the pose determination and observations captured after the pose determination. Although only one level of the gesture tree is illustrated, by adding additional pauses (e.g., stationary periods between measurements) an even greater number of gestures may be determined without significant changes to the underlying hardware or techniques.

Figure 4:
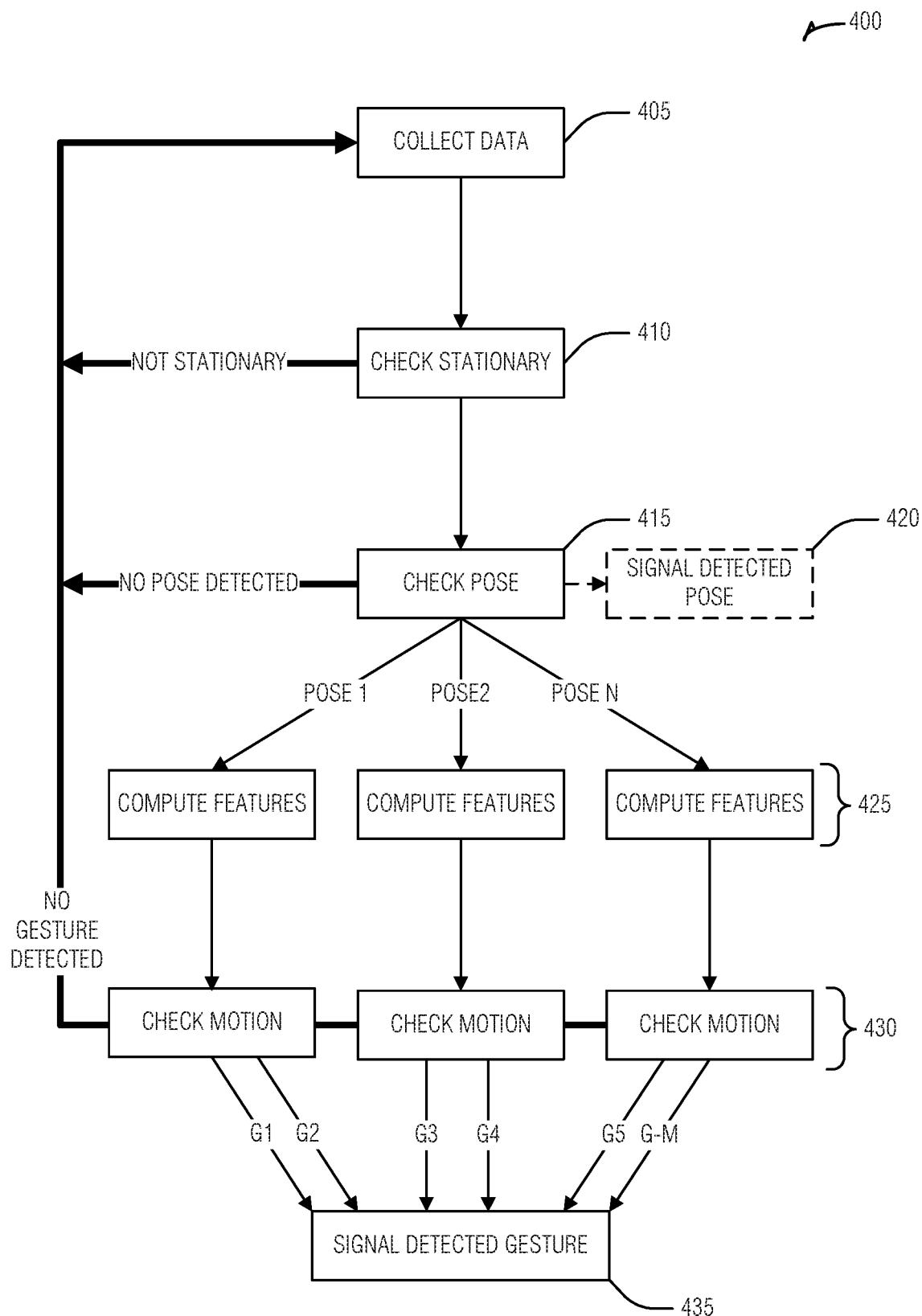
FIG. 4 illustrates an example of a method for gesture capture, according to an embodiment.

FIG. 4 illustrates an example of a method 400 for gesture capture, according to an embodiment. The operations of the method 400 are implemented in computer hardware, such as that described below with respect to FIG. 6 (e.g., circuitry). The method 400 starts with data collection. A data point is collected from a gyroscope and an accelerometer (e.g., operation 405). In an example, a low pass filter is used to reduce sensor noise.

The method 400 may move on to a pose trigger. Using features computed from a current data point and a small number of preceding data points (e.g., a running average, etc.), it is determined if both: A) the sensor is substantially stationary (e.g., operation 410); and B) if the device is in one of a number of preset positions which is associated with a pose (e.g., operation 415). In an example, whether the sensor is stationary is determined by measuring the average recent angular velocity and comparing with a threshold (e.g., if the average is below the threshold the device is stationary and moving otherwise). In an example, whether the sensor is in a pose is measured by taking the average value of recent accelerometer reading on the x, y, and z axes and classifying the reading using a clustering algorithm. In these examples, because the averages may be computed using a running count, data buffering is minimized, and as few as four features are computed (e.g., angular velocity, acceleration on x, y, and z axes).

If the device is determined to be in a known pose, the method 400 proceeds motion classification. If the device is not stationary or the pose was not detected, the averages are reset and the method moves back to data collection (e.g., operation 405). This technique of stationary pose detection greatly reduces computation cost and storage needs. Further, this technique differentiates among a large number of possible gestures with fewer measurements, for example, as two different gestures with similar motion characteristics are distinguished if they start from distinct initial poses. If a pose is detected, there is the option to signal to the user that the device has detected a pose and will start looking for a gesture (e.g., operation 420)—this feedback may help avoid false positives.

The method 400 may proceed with collecting motion features. If a pose is detected, for a short duration of time (e.g., about 0.5 seconds) after the sensor starts moving again, machine learning features are computed from the gyroscope (e.g., operations 425) for example. In an example, a small number of features (e.g., between three and seven) are computed along the x, y, and z gyroscope axes. Example features may include maximum speed, minimum speed, absolute sum (e.g., sum of absolute values), among others. Once feature collection is complete, these machine learning features are passed to the motion classifier.

The method 400 proceeds with the motion classifier. As noted above, once motion feature collection is complete, the computed features are passed to a machine learning clustering algorithm (e.g., operations 430). In an example, depending on the number of features selected for each axis, there may between nine and twenty one features analyzed for the motion classification. If the features are measured to be sufficiently similar to a pre-learned canonical set of gesture parameters, the motion is classified as the corresponding gesture (e.g., illustrated gestures G1-GM), if not, the motion is rejected as not being a gesture. This prevents false positives even after the gesture classifier is triggered. That is, each pose has a different set of machine learned gestures associated with them, so the possibility of confusion by the algorithm is greatly decreased—for example, there is no chance a gesture started from Pose 1 will be identified as a gesture which starts from Pose 2. If a gesture is detected, a signal is sent out from the algorithm, and if not, the algorithm resets to data collection.

The method 400 may be extended to permit the user to create new gestures or poses. This training piece occurs without writing any source code or otherwise modifying the underlying system. To train a pose, the user holds the device steady in the pose of choice and triggers the training with a start button, for example, on the device. Data is collected as long as the device is held still. This may be repeated several times to collect several samples. The several samples are used to determine an optimal canonical pose as well as measure the variance between different features in the same pose. This allows for more robust computations of cluster distance. Once a pose is trained, the motion of a gesture may also be trained by simply starting data collection again and performing the gesture from the starting position. This may also be done repeatedly to collect several samples and once again compute an optimal canonical set of motion features, as well as a robust distance metric. Thus, the code and system are unchanged for new gesture or pose incorporation except for storing the pose characteristics or gesture characteristics (e.g., for a new gesture, a small number of values associated with the pose and gesture cluster centers). The training may be performed using an app written to a smartphone, tablet, or other device with basic connectivity to the device.

Figure 5:
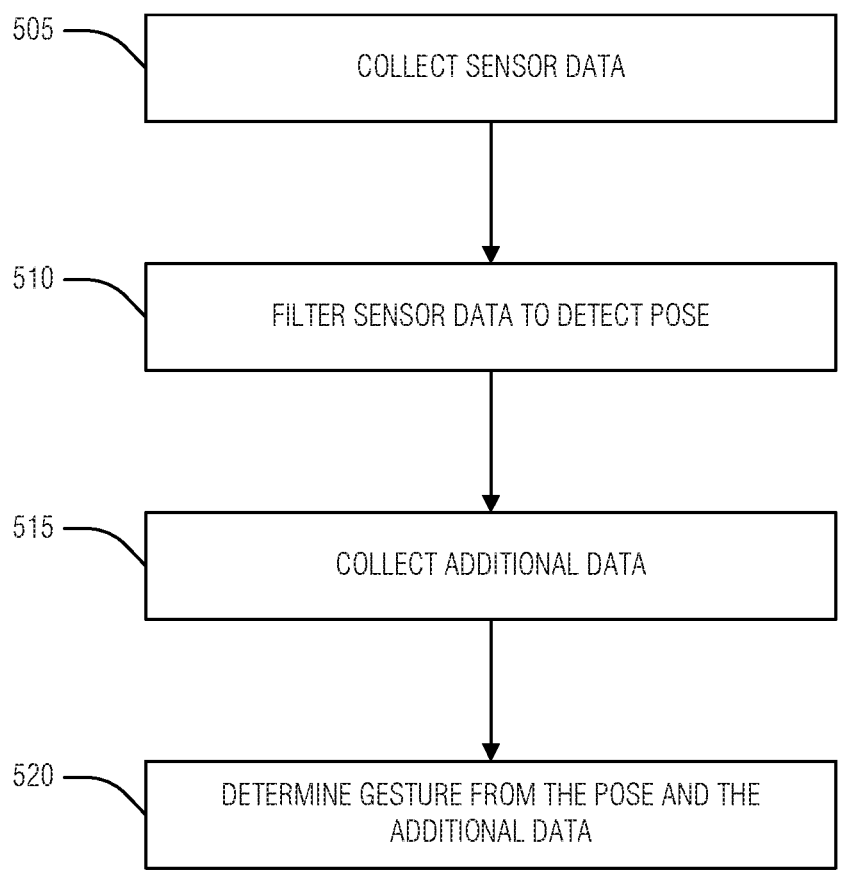
FIG. 5 illustrates a flow diagram of an example of a method for gesture capture, according to an embodiment.

FIG. 5 illustrates a flow diagram of an example of a method 500 for gesture capture, according to an embodiment. The operations of the method 500 are implemented in computer hardware, such as that described below with respect to FIG. 6 (e.g., circuitry).

At operation 505, a first representation of a sensor array may be collected into a first sensor composition. In an example, the sensor array includes a gyroscope. In an example, collecting the first representation into the first sensor composition includes storing an angular velocity average in a buffer, accepting an additional gyroscope sample, and updating the angular velocity average in the buffer with the additional gyroscope sample. In an example, the first sensor composition is provided after a predetermined number of gyroscope samples are taken. In an example, the predetermined number is four.

In an example, the sensor array includes an accelerometer. In an example, collecting a representation of the sensor array includes storing an acceleration average in a buffer, accepting an additional accelerometer sample, and updating the acceleration average in the buffer with the additional accelerometer sample. In an example, the first sensor composition is provided after a predetermined number of accelerometer samples are taken. In an example, the predetermined number is four.

At operation 510, the first sensor composition may be filtered to output a pose status. In this example, the pose status corresponds to a pose in a library of poses. In an example, gyroscope samples of the first sensor composition are used to identify a pose in the pose status. In an example, accelerometer samples of the first sensor composition are used to identify a pose in the pose status.

In an example, accelerometer samples of the first sensor composition are used to identify that the device is stationary in the pose status. In an example, to identify whether the device is stationary includes keeping a running average of accelerometer samples of a sample period, comparing the running average against a threshold—the method being stationary if the running average is below the threshold and not stationary otherwise.

At operation 515, a second representation of the sensor array may be collected into a second sensor composition. In an example, the second sensor composition is derived entirely from gyroscope samples. In an example, the first representation of the sensor array is cleared prior to collecting the second representation of the sensor array.

At operation 520, a fit of the second sensor composition to a model may be measured. In an example, the model is a collection of cluster points, and wherein measuring the fit of the second sensor composition to the model includes comparing pieces of the second sensor composition to the cluster points. The results of the fit measurement, (e.g., selecting a specific gesture) is provided to a gesture consumer.

The method 500 may be optionally extended to include applying a low-pass filter to sensor array data reduce sensor noise in sensor samples. The method 500 may also be optionally extended to encompass training a device to recognize new poses or gestures. The training may be activated by receiving indication that a user actuated a user interface. The training continues by creating a new pose from the first sensor composition. That is, the data of a first sensor composition (e.g., sensor compositions prior to pose detection or after gesture detection/rejection) is used for pose creation. The training may continue with adding the new pose to the pose library. The training may continue with creating a new model of a gesture for the classifier from the second sensor composition. In an example, the new pose or the new model are refined from subsequent first sensor compositions and second sensor compositions.

Figure 6:
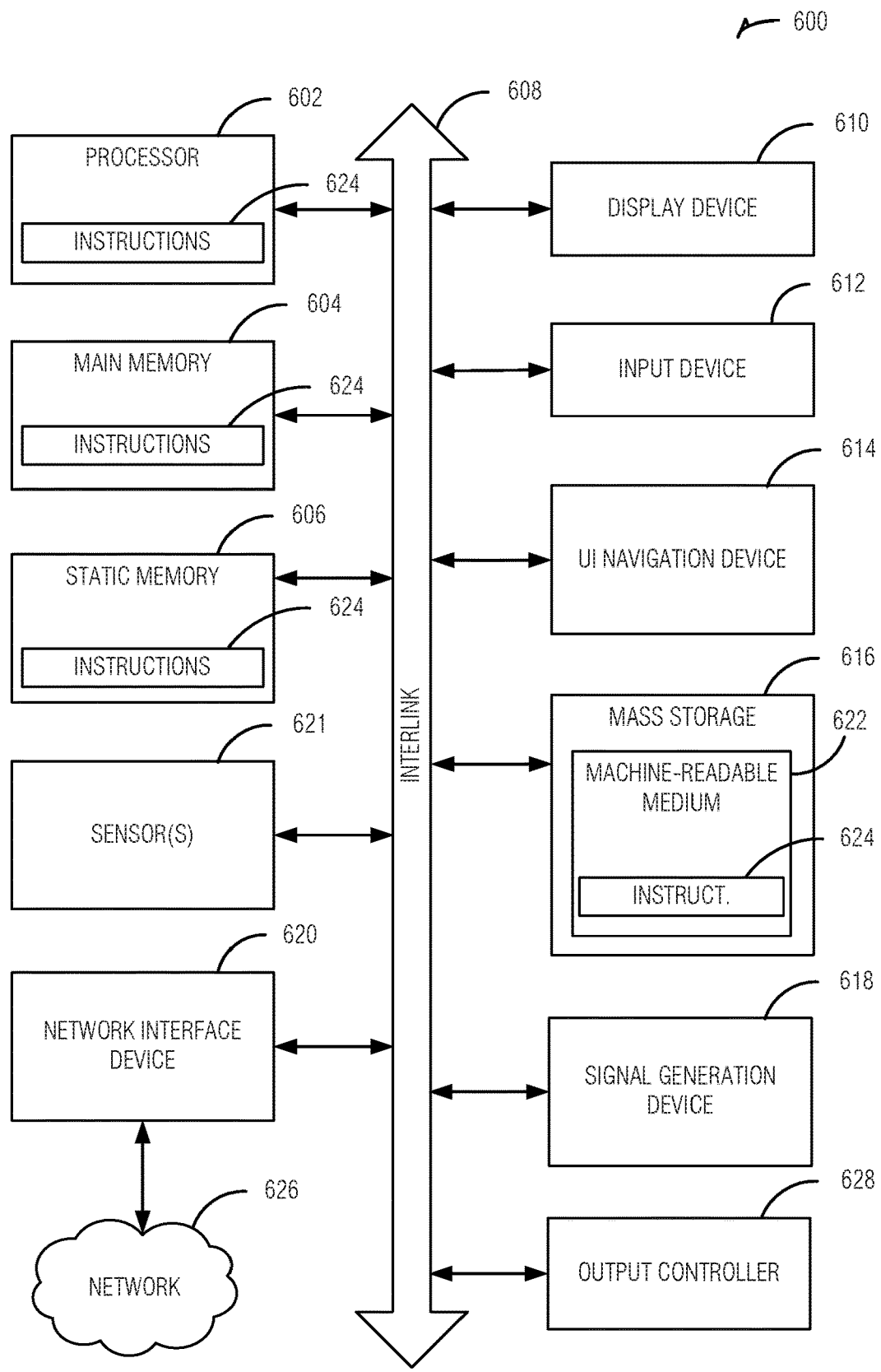
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a device for gesture capture, the device comprising: an accumulator to: collect a first representation of a sensor array into a first sensor composition; and collect a second representation of the sensor array into a second sensor composition; a filter to provide output based on the first sensor composition, the output including a pose status, the pose status corresponding to a pose in a library of poses; and a classifier including: an input to obtain the second sensor composition; a pattern to measure a fit of the second sensor composition to a model; and an output to provide a gesture to a gesture consumer, the gesture determined by the fit and the pose.

In Example 2, the subject matter of Example 1 optionally includes wherein the sensor array includes a gyroscope.

In Example 3, the subject matter of Example 2 optionally includes wherein the accumulator includes: a buffer to store an angular velocity average; and a calculator to: accept an additional gyroscope sample; and update the angular velocity average in the buffer with the additional gyroscope sample.

In Example 4, the subject matter of any one or more of Examples 2-3 optionally include wherein the accumulator is to provide the first sensor composition after a predetermined number of gyroscope samples are taken.

In Example 5, the subject matter of Example 4 optionally includes wherein the predetermined number is four.

In Example 6, the subject matter of any one or more of Examples 2-5 optionally include wherein gyroscope samples of the first sensor composition are used by the filter to identify a pose in the pose status.

In Example 7, the subject matter of any one or more of Examples 2-6 optionally include wherein the second sensor composition is derived entirely from gyroscope samples.

In Example 8, the subject matter of any one or more of Examples 1-7 optionally include wherein the sensor array includes an accelerometer.

In Example 9, the subject matter of Example 8 optionally includes wherein the accumulator includes: a buffer to store an acceleration average; and a calculator to: accept an additional accelerometer sample; and update the acceleration average in the buffer with the additional accelerometer sample.

In Example 10, the subject matter of any one or more of Examples 8-9 optionally include wherein the accumulator is to provide the first sensor composition after a predetermined number of accelerometer samples are taken.

In Example 11, the subject matter of Example 10 optionally includes wherein the predetermined number is four.

In Example 12, the subject matter of any one or more of Examples 8-11 optionally include wherein accelerometer samples of the first sensor composition are used by the filter to identify that the device is stationary in the pose status.

In Example 13, the subject matter of Example 12 optionally includes wherein to identify whether the device is stationary includes the filter to: keep a running average of accelerometer samples of a sample period; and compare the running average against a threshold, the device being stationary if the running average is below the threshold and not stationary otherwise.

In Example 14, the subject matter of any one or more of Examples 1-13 optionally include a low-pass filter between the sensor array and the accumulator, the low pass filter to reduce sensor noise in sensor samples.

In Example 15, the subject matter of any one or more of Examples 1-14 optionally include wherein the accumulator is to clear the first sensor composition prior to the accumulator's collection of the second representation of the sensor array.

In Example 16, the subject matter of any one or more of Examples 1-15 optionally include wherein the model is a collection of cluster points, and wherein to measure a fit of the second sensor composition to the model, the classifier is to compare pieces of the second sensor composition to the cluster points.

In Example 17, the subject matter of any one or more of Examples 1-16 optionally include a user input device; and a trainer, the trainer activated via actuation of the user input device, the trainer to: create a new pose from the first sensor composition; add the new pose to the pose library; and create a new model of a gesture for the classifier from the second sensor composition.

In Example 18, the subject matter of Example 17 optionally includes wherein the trainer refines the new pose or the new model from subsequent first sensor compositions and second sensor compositions.

Example 19 is a method for gesture capture performed by a device, the method comprising: collecting a first representation of a sensor array into a first sensor composition filtering the first sensor composition to output a pose status, the pose status corresponding to a pose in a library of poses; collecting a second representation of the sensor array into a second sensor composition; measuring a fit of the second sensor composition to a model; and outputting to provide the fit to a gesture consumer based on the fit and the pose.

In Example 20, the subject matter of Example 19 optionally includes wherein the sensor array includes a gyroscope.

In Example 21, the subject matter of Example 20 optionally includes wherein collecting a representation of the sensor array includes: storing an angular velocity average in a buffer; accepting an additional gyroscope sample; and updating the angular velocity average in the buffer with the additional gyroscope sample.

In Example 22, the subject matter of any one or more of Examples 20-21 optionally include wherein the first sensor composition is provided after a predetermined number of gyroscope samples are taken.

In Example 23, the subject matter of Example 22 optionally includes wherein the predetermined number is four.

In Example 24, the subject matter of any one or more of Examples 20-23 optionally include wherein gyroscope samples of the first sensor composition are used to identify a pose in the pose status.

In Example 25, the subject matter of any one or more of Examples 20-24 optionally include wherein the second sensor composition is derived entirely from gyroscope samples.

In Example 26, the subject matter of any one or more of Examples 19-25 optionally include wherein the sensor array includes an accelerometer.

In Example 27, the subject matter of Example 26 optionally includes wherein collecting a representation of the sensor array includes: storing an acceleration average in a buffer; accepting an additional accelerometer sample; and updating the acceleration average in the buffer with the additional accelerometer sample.

In Example 28, the subject matter of any one or more of Examples 26-27 optionally include wherein the first sensor composition is provided after a predetermined number of accelerometer samples are taken.

In Example 29, the subject matter of Example 28 optionally includes wherein the predetermined number is four.

In Example 30, the subject matter of any one or more of Examples 26-29 optionally include wherein accelerometer samples of the first sensor composition are used to identify that the device is stationary in the pose status.

In Example 31, the subject matter of Example 30 optionally includes wherein to identify whether the device is stationary includes: keeping a running average of accelerometer samples of a sample period; and comparing the running average against a threshold, the method being stationary if the running average is below the threshold and not stationary otherwise.

In Example 32, the subject matter of any one or more of Examples 19-31 optionally include applying a low-pass filter to sensor array data reduce sensor noise in sensor samples.

In Example 33, the subject matter of any one or more of Examples 19-32 optionally include wherein the first sensor composition is cleared prior to collecting the second representation of the sensor array.

In Example 34, the subject matter of any one or more of Examples 19-33 optionally include wherein the model is a collection of cluster points, and wherein measuring the fit of the second sensor composition to the model includes comparing pieces of the second sensor composition to the cluster points.

In Example 35, the subject matter of any one or more of Examples 19-34 optionally include activating a training mode via actuation of a user interface;
creating a new pose from the first sensor composition; adding the new pose to the pose library; and creating a new model of a gesture for the classifier from the second sensor composition.

In Example 36, the subject matter of Example 35 optionally includes wherein the new pose or the new model are refined from subsequent first sensor compositions and second sensor compositions.

Example 37 is at least one machine readable medium including instructions that, when executed machine a machine, cause the machine to perform any of the methods of 19-36.

Example 38 is a device including means to perform any of the methods of 19-36.

Example 39 is a system for gesture capture performed by a device, the system comprising: means for collecting a first representation of a sensor array into a first sensor composition means for filtering the first sensor composition to output a pose status, the pose status corresponding to a pose in a library of poses; means for collecting a second representation of the sensor array into a second sensor composition; means for measuring a fit of the second sensor composition to a model; and means for outputting to provide the fit to a gesture consumer based on the fit and the pose.

In Example 40, the subject matter of Example 39 optionally includes wherein the sensor array includes a gyroscope.

In Example 41, the subject matter of Example 40 optionally includes wherein collecting a representation of the sensor array includes: means for storing an angular velocity average in a buffer; means for accepting an additional gyroscope sample; and means for updating the angular velocity average in the buffer with the additional gyroscope sample.

In Example 42, the subject matter of any one or more of Examples 40-41 optionally include wherein the first sensor composition is provided after a predetermined number of gyroscope samples are taken.

In Example 43, the subject matter of Example 42 optionally includes wherein the predetermined number is four.

In Example 44, the subject matter of any one or more of Examples 40-43 optionally include wherein gyroscope samples of the first sensor composition are used to identify a pose in the pose status.

In Example 45, the subject matter of any one or more of Examples 40-44 optionally include wherein the second sensor composition is derived entirely from gyroscope samples.

In Example 46, the subject matter of any one or more of Examples 39-45 optionally include wherein the sensor array includes an accelerometer.

In Example 47, the subject matter of Example 46 optionally includes wherein collecting a representation of the sensor array includes: means for storing an acceleration average in a buffer; means for accepting an additional accelerometer sample; and means for updating the acceleration average in the buffer with the additional accelerometer sample.

In Example 48, the subject matter of any one or more of Examples 46-47 optionally include wherein the first sensor composition is provided after a predetermined number of accelerometer samples are taken.

In Example 49, the subject matter of Example 48 optionally includes wherein the predetermined number is four.

In Example 50, the subject matter of any one or more of Examples 46-49 optionally include wherein accelerometer samples of the first sensor composition are used to identify that the device is stationary in the pose status.

In Example 51, the subject matter of Example 50 optionally includes wherein to identify whether the device is stationary includes: means for keeping a running average of accelerometer samples of a sample period; and means for comparing the running average against a threshold, the system being stationary if the running average is below the threshold and not stationary otherwise.

In Example 52, the subject matter of any one or more of Examples 39-51 optionally include means for applying a low-pass filter to sensor array data reduce sensor noise in sensor samples.

In Example 53, the subject matter of any one or more of Examples 39-52 optionally include wherein the first sensor composition is cleared prior to collecting the second representation of the sensor array.

In Example 54, the subject matter of any one or more of Examples 39-53 optionally include wherein the model is a collection of cluster points, and wherein measuring the fit of the second sensor composition to the model includes comparing pieces of the second sensor composition to the cluster points.

In Example 55, the subject matter of any one or more of Examples 39-54 optionally include means for activating a training mode via actuation of a user interface; means for creating a new pose from the first sensor composition; means for adding the new pose to the pose library; and means for creating a new model of a gesture for the classifier from the second sensor composition.

In Example 56, the subject matter of Example 55 optionally includes wherein the new pose or the new model are refined from subsequent first sensor compositions and second sensor compositions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for gesture capture, the device comprising:
an accumulator to:
collect a first representation of a sensor array into a first sensor composition; and
collect a second representation of the sensor array into a second sensor composition;
a filter to provide output based on the first sensor composition, the output including a pose status, the pose status corresponding to a pose in a library of poses, wherein the second sensor composition is collected in response to the pose status corresponding to the pose in the library of poses; and
a classifier including:
an input to obtain the second sensor composition;
a pattern to measure a fit of the second sensor composition to a model, the model selected from several models based on the pose; and
an output to provide a gesture to a gesture consumer, the gesture determined by the fit to the model that corresponds to the pose.

2. The device of claim 1, wherein the sensor array includes a gyroscope.

3. The device of claim 2, wherein the accumulator includes:
a buffer to store an angular velocity average; and
a calculator to:
accept an additional gyroscope sample; and
update the angular velocity average in the buffer with the additional gyroscope sample.

4. The device of claim 2, wherein gyroscope samples of the first sensor composition are used by the filter to identify a pose in the pose status.

5. The device of claim 1, wherein the sensor array includes an accelerometer.

6. The device of claim 5, wherein the accumulator includes:
a buffer to store an acceleration average; and
a calculator to:
accept an additional accelerometer sample; and
update the acceleration average in the buffer with the additional accelerometer sample.

7. The device of claim 5, wherein accelerometer samples of the first sensor composition are used by the filter to identify that the device is stationary in the pose status.

8. The device of claim 1, wherein the model is a collection of cluster points, and wherein to measure a fit of the second sensor composition to the model, the classifier is to compare pieces of the second sensor composition to the cluster points.

9. A method for gesture capture performed by a device, the method comprising:
collecting a first representation of a sensor array into a first sensor composition
filtering the first sensor composition to output a pose status, the pose status corresponding to a pose in a library of poses;
collecting a second representation of the sensor array into a second sensor composition, in response to the pose status corresponding to the pose in the library of poses;
measuring a fit of the second sensor composition to a model, the model selected from several models based on the pose; and
outputting to provide a gesture to a gesture consumer, the gesture determined by the fit to the model that corresponds to the pose.

10. The method of claim 9, wherein the sensor array includes a gyroscope.

11. The method of claim 10, wherein collecting a representation of the sensor array includes:
storing an angular velocity average in a buffer;
accepting an additional gyroscope sample; and
updating the angular velocity average in the buffer with the additional gyroscope sample.

12. The method of claim 10, wherein gyroscope samples of the first sensor composition are used to identify a pose in the pose status.

13. The method of claim 9, wherein the sensor array includes an accelerometer.

14. The method of claim 13, wherein collecting a representation of the sensor array includes:
storing an acceleration average in a buffer;
accepting an additional accelerometer sample; and updating the acceleration average in the buffer with the additional accelerometer sample.

15. The method of claim 13, wherein accelerometer samples of the first sensor composition are used to identify that the device is stationary in the pose status.

16. The method of claim 9, wherein the model is a collection of cluster points, and wherein measuring the fit of the second sensor composition to the model includes comparing pieces of the second sensor composition to the cluster points.

17. At least one non-transitory machine readable medium including instructions for gesture capture performed by a device, the instructions, when executed machine a machine, causing the machine to:
   collect a first representation of a sensor array into a first sensor composition filter the first sensor composition to output a pose status, the pose status corresponding to a pose in a library of poses;
   collect a second representation of the sensor array into a second sensor composition, in response to the pose status corresponding to the pose in the library of poses;
   measure a fit of the second sensor composition to a model, the model selected from several models based on the pose; and
   output to provide a gesture to a gesture consumer, the gesture determined by the fit to the model that corresponds to the pose.

18. The at least one non-transitory machine readable medium of claim 17, wherein the sensor array includes a gyroscope.

19. The at least one non-transitory machine readable medium of claim 18, wherein the instructions to collect the representation of the sensor array include instructions to cause the machine to:
   store an angular velocity average in a buffer;
   accept an additional gyroscope sample; and
   update the angular velocity average in the buffer with the additional gyroscope sample.

20. The at least one non-transitory machine readable medium of claim 18, wherein gyroscope samples of the first sensor composition are used to identify a pose in the pose status.

21. The at least one non-transitory machine readable medium of claim 17, wherein the sensor array includes an accelerometer.

22. The at least one non-transitory machine readable medium of claim 21, wherein the instructions to collect the representation of the sensor array include instructions to cause the machine to:
   store an acceleration average in a buffer;
   accept an additional accelerometer sample; and
   update the acceleration average in the buffer with the additional accelerometer sample.

23. The at least one non-transitory machine readable medium of claim 21, wherein accelerometer samples of the first sensor composition are used to identify that the device is stationary in the pose status.

24. The at least one non-transitory machine readable medium of claim 17, wherein the model is a collection of cluster points, and wherein the instructions to measure the fit of the second sensor composition to the model include instructions that cause the machine to compare pieces of the second sensor composition to the cluster points.

* * * * *